United States Patent [19]

Radia et al.

[11] Patent Number: 5,922,049
[45] Date of Patent: Jul. 13, 1999

[54] METHOD FOR USING DHCP AND MARKING TO OVERRIDE LEARNED IP ADDESSESES IN A NETWORK

[75] Inventors: Sanjay R. Radia, Fremont; Thomas K. Wong, Pleasanton; Swee B. Lim, Cupertino; Panagiotis Tsirigotis, Mountain View; Robert J. Goedman, Palo Alto, all of Calif.; Michael W. Patrick, Assonet, Mass.

[73] Assignee: Sun Microsystems, Inc., Palo Alto, Calif.

[21] Appl. No.: 08/762,933

[22] Filed: Dec. 9, 1996

[51] Int. Cl.$^6$ ........................................................ G06F 13/00
[52] U.S. Cl. ............... 709/220; 395/200.68; 395/200.69; 395/200.7
[58] Field of Search .................. 395/200.72, 200.68, 395/200.69, 200.7, 200.56; 370/401, 219

[56] References Cited

U.S. PATENT DOCUMENTS

| | | | |
|---|---|---|---|
| 5,473,599 | 12/1995 | Li et al. | 370/219 |
| 5,754,790 | 5/1998 | France et al. | 395/200.68 |
| 5,790,548 | 8/1998 | Sistanizadeh et al. | 370/401 |
| 5,805,594 | 9/1998 | Kotchey et al. | 370/401 |
| 5,835,723 | 11/1998 | Andrews et al. | 395/200.56 |

FOREIGN PATENT DOCUMENTS 0 483 547 A1   7/1991   European Pat. Off. .

OTHER PUBLICATIONS

R. Droms, "Dynamic Host Configuration Protocol", *RFC 1541*, Bucknell University, Oct. 1993.

Lee Bruno, "IP Addressing Tools, Containing the Chaos," Data Communications, vol. 25, No. 12, Sep. 1996, pp. 71–74 and 76, XP 000626550.

Danny Cohen, Jonathan B. Postel and Raphael Rom, "IP Addressing and Routing in a Local Wireless Network," One World Through Communications, Florence, May 4–8, 1992, vol. 2, No. Conf. 11, Jan. 1, 1992, Institute of Electrical and Electronics Engineers, pp. 0626–0632, XP 000300088.

Perkins et al., "DHCP for Mobile Networking with TCP/IP", Apr. 1995, pp. 255–261, IEEE.

Green, "Protocols for A Self-Healing Network", Jul. 1995, pp. 252–256, IEEE.

*Primary Examiner*—Le Hien Luu
*Attorney, Agent, or Firm*—Graham & James LLP

[57] ABSTRACT

A preferred embodiment of the present invention includes a method and apparatus for routing an IP packets in a network of client systems. The router forwards IP packets between the client systems and the server systems. More specifically, the router can be pre-configured to include one or more "routes." Each route is a mapping between an IP address and a client system. The router may also learn route from other routers and by analysis of IP packets. Preferably, the routes known by the router are included in a route table. The router also monitors DHCP assignment of IP addresses to client systems within the network. When the DHCP assignment of an IP address is detected, the router creates a new route that associates the newly assigned IP address and the corresponding client system. The new route is marked so that it may only be overwritten by a subsequent DHCP assignment. The router then updates the route table to include the new route and purges the route table of learned routes that have been invalidated by the new route. In this way, the present invention allows dynamically assigned IP addresses to override learned routes.

18 Claims, 3 Drawing Sheets

METHOD FOR USING DHCP AND MARKING TO OVERRIDE LEARNED IP ADDESSESES IN A NETWORK

RELATED APPLICATIONS

The following co-pending patent applications, which were filed on Dec. 9, 1996, are related to the subject application and are herein incorporated by reference:
1. Application Ser. No. 08/763,234, now pending, entitled "Method and Apparatus for Client-Sensitive Name Resolution Using DNS" of Swee Boon Lim, Sanjay R. Radia, and Thomas Wong.
2. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman which issued on Nov. 10, 1998 as U.S. Pat. No. 5,835,727.
3. Application Ser. No. 08/762,402, U.S. Pat. No. 5,848,233 entitled "Method and Apparatus for Dynamic Packet Filter Assignments" of Sanjay R. Radia, Swee Boon Lim, Panagiotis Tsirigotis, Thomas Wong, and Rob Goedman.
4. Application Ser. No. 08/763,289, now pending entitled "Load Balancing and Failover of Network Services" of Swee Boon Lim, Ashish Singhai, and Sanjay R. Radia.
5. Application Ser. No. 08/763,068, U.S. Pat. No. 5,884,024 entitled "Secure DHCP Server" of Swee Boon Lim, Sanjay R. Radia, Thomas Wong, Panagiotis Tsirigotis, and Rob Goedman.
6. Application Ser. No. 08/763,212, now pending entitled "A Method to Activate Unregistered Systems in a Distributed Multiserver Network Environment" of Thomas Wong and Sanjay R. Radia.
7. Application Ser. No. 08/762,709, now pending entitled "A Method and Apparatus for Assignment of IP Addresses" of Thomas Wong, Swee Boon Lim, Sanjay R. Radia, Panagiotis Tsirigotis, and Rob Goedman.
8. Application Ser. No. 08/762,705, now pending, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:
9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method and apparatus for assignment of IP addresses to client systems in a multi-server environment.

BACKGROUND OF THE INVENTION

Computer networks that use the Internet protocol are commonly referred to as "IP networks." Within IP networks, host systems and other objects are identified by thirty-two bit numbers, known as Internet Protocol Addresses (IP addresses). IP addresses provide a simple mechanism for identifying the source and destination of messages sent within IP networks.

Traditionally, IP addresses that identify objects within IP networks have been assigned statically during network configuration. Using this type of assignment, routers and other network components are pre-configured to use the statically assigned bindings that correlate objects and their IP addresses. Generally, this method of address assignment has proven to be adequate, if not ideal, in networks where a limited number of objects are involved and where the IP addresses assigned to each object change infrequently.

In large or rapidly changing networks, static assignment of IP addresses is often inadequate. As a result, several methods have been developed that allow IP addresses to be dynamically learned. For example, in some IP networks, routers analyze IP packets received from client systems. The source addresses in these packets are extracted and used to update routes within the router. Unfortunately, clients systems may forge the source addresses included in IP packets. This fools the router into relearning the forged IP address. Thus, IP address learning may not be secure in environments where client systems cannot be trusted not to forge source IP addresses.

To address this problem, some routers lock addresses that have been learned. These routers refuse to relearn a route for the involved IP address until a predefined period of inactivity has passed. The locking allows a client system to continue to use an IP address without danger of the router being fooled into reassigning the IP address. The period of inactivity allows client systems to be moved to new IP addresses with the router automatically learning the new IP address of the client system.

Increasingly, IP addresses within networks are assigned by server systems using the Dynamic Host Configuration Protocol (DHCP) as is defined in Internet RFC 1541 (incorporated by reference herein). For networks that use the DHCP protocol, one or more DHCP servers listen for messages requesting IP addresses. If possible, the DHCP server then allocates an IP address for the client system sending the message. The newly allocated IP address is then included in a message sent by the DHCP server to the client system. The IP address is "leased" to the client system. Client systems that fail to periodically renew their leases may loose their allocated IP addresses.

In general, the use of DHCP servers to assign IP addresses to client systems has proven to be highly beneficial. This is especially true in networks that include a large number of client systems. Unfortunately, there is presently no secure mechanism that allows routers that learn IP addresses to learn the IP addresses that are assigned by DHCP server systems.

SUMMARY OF THE INVENTION

A preferred embodiment of the present invention includes a method and apparatus for assignment of IP addresses to client systems in a multi-server networked environment. More specifically, a preferred environment for the present invention is a computer network that includes a series of client systems and a series of server systems. Each client system is connected to a corresponding cable modem that is connected, in turn, to a router. The network includes one or more DHCP server systems that provide for allocation of IP addresses in accordance with the Dynamic Host Configuration Protocol (DHCP) defined in Internet RFC 1541.

The router forwards IP packets between the client systems and the server systems. More specifically, the router can be pre-configured to include one or more "routes." Each route is a mapping between an IP address and a client system. Preferably, the routes known by the router are included in a route table. When the router receives an IP packet, it extracts the destination address of the packet from the packet's header. The router then searches the route table for a route that matches the destination address of the received IP packet. If the router finds a matching route, the router forwards the IP packet to the client system included in the matching route.

The router examines IP packets received from client systems. The source IP addresses included in these packets are extracted and used by the router to establish new routes to the client systems. This is known as IP address "learning." Once an IP address is learned, it is "locked." Locking prevents the IP address from being relearned until a predetermined time period has elapsed. This prevents other client systems from forging IP source address to fool the router into incorrectly relearning routes.

Using the DHCP protocol, client systems request and receive dynamically allocated IP addresses from the DHCP server systems. The router listens for DHCPACK messages sent by DHCP server systems to the client systems. The DHCPACK message includes an IP address that has been allocated to a specific client system. When the router detects a DHCPACK message, the router extracts the IP address allocated for the client system. Using the IP address included in the DHCPACK message, the router "learns" the IP address of the client system requesting an IP address. The router then adds the route to its route table. The new route is marked to indicate that it has been assigned by the DHCP server. Thereafter, the router will only relearn this IP address if it is reassigned by the DHCP server system.

In some cases, the learned IP address will conflict with a route originally configured within the router's route table. In these cases, the conflicting route is removed from the route table. In this way, the present invention allows routes that reflect dynamically allocated IP addresses to replace already configured routes.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
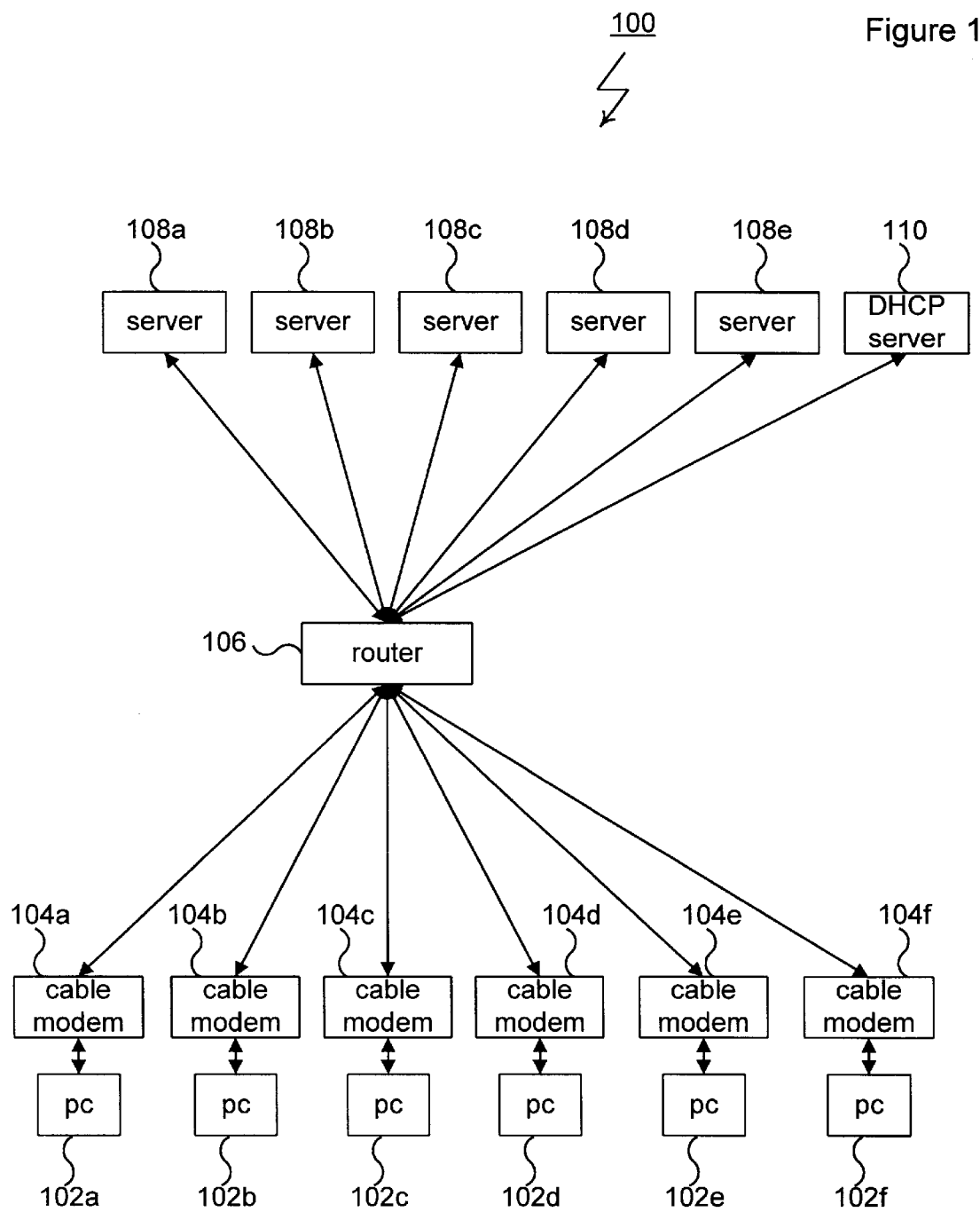
FIG. 1 is a block diagram of a computer network shown as a representative environment for a preferred embodiment of the present invention.

In FIG. 1, a computer network 100 is shown as a representative environment for the present invention. Structurally, computer network 100 includes a series of client systems 102, of which client systems 102a through 102f are representative. Each client system 102 may be selected from a range of differing devices including, but not limited to, the personal computers shown in FIG. 1. A cable modem 104 is connected to each client system 102. Each cable modem 104 is connected, in turn, to a cable router 106. The use of cable router 106 and cable modems 104 is also intended to be exemplary and it should be appreciated that other networking technologies and topologies are equally practical. It should also be appreciated that a number of different cable modems and cable routers are available from various manufactures. In particular, cable modem 104 can be a CyberSUFR cable modem and cable router 106 can be a CableMASTR cable router, both supplied by Motorola, Inc.

Figure 2:
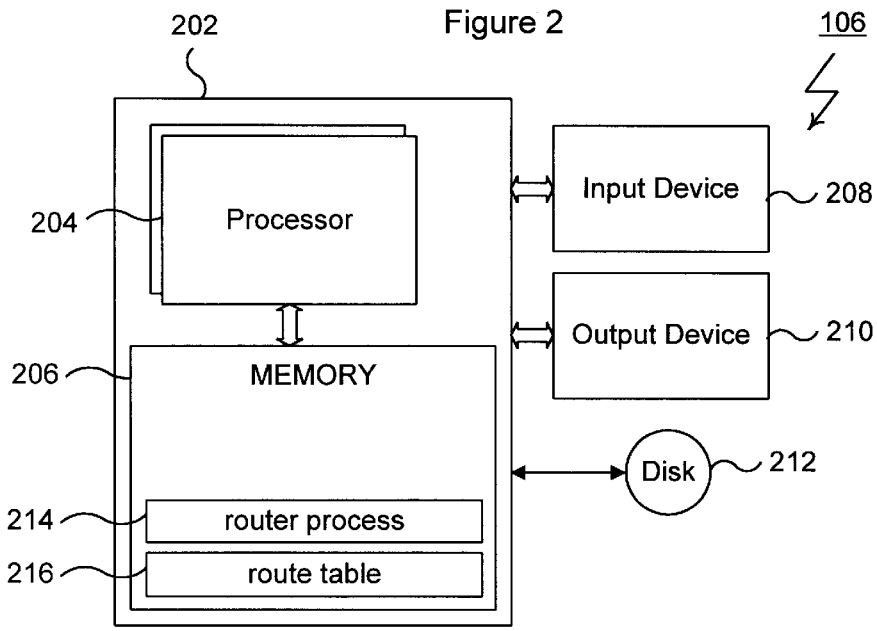
FIG. 2 is a block diagram of a router used by a preferred embodiment of the present invention.

Router 106 is shown in more detail in FIG. 2 to include a computer system 202 that, in turn, includes a processor, or processors 204, and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. A router process 214 and route table 216 are shown to be resident in memory 206 of computer system 202. Route table 216 includes one or more "routes" that associate client systems 102 and corresponding IP addresses. For the purpose of illustration, it may be assumed that one or more of the routes included in the route table 216 have been added manually as part of the configuration of the router 106. When router 106 receives an IP packet, the router process 214 extracts the destination address included in the packet header. The router process 214 then searches the route table 216 for a route that matches the destination address of the received IP packet. If the router finds a matching route, the router process 214 forwards the IP packet to the client system 102 included in the matching route.

Router 106 analyzes IP packets that are received from the client systems 102. The source IP addresses included in these packets are extracted and used by the router 106 modify the route table 216 to establish new routes that reflect the source addresses included in these IP packets. This is known as IP address "learning." Once an IP address is learned, it is "locked." Locking prevents the router 106 from relearning the route associated with an IP address until a predetermined time period of inactivity has elapsed. In this context, a route is inactive is the router 106 does not include any IP packets having a source address that matches the IP address associated with the route. This prevents other client systems 102 from forging IP source address to fool the router into incorrectly relearning routes.

Computer network 100 also includes a series of server systems 108, of which server systems 108a through 108e are representative. Each server system 108 is connected to cable router 106. Generally, server systems 108 are intended to represent the broad range of server systems that may be found within computer networks.

A DHCP server system 110 is also included in computer network 100 and connected to cable router 106. DHCP server system 110 is a computer or other system that implements Dynamic Host Configuration Protocol (DHCP) defined in Internet RFC 1541, which is incorporated herein by reference. Functionally, DHCP server system 110 provides for allocation of IP addresses within network 100. Although FIG. 1 shows only a single DHCP server system 110, it is to be understood that additional DHCP server systems 110 may be used without departing from the spirit of the present invention. It should also be appreciated that the connections between the various components of FIG. 1 are intended to represent logical connections. The physical topology used for these connections may vary from what is pictured in FIG. 1.

Figure 3:
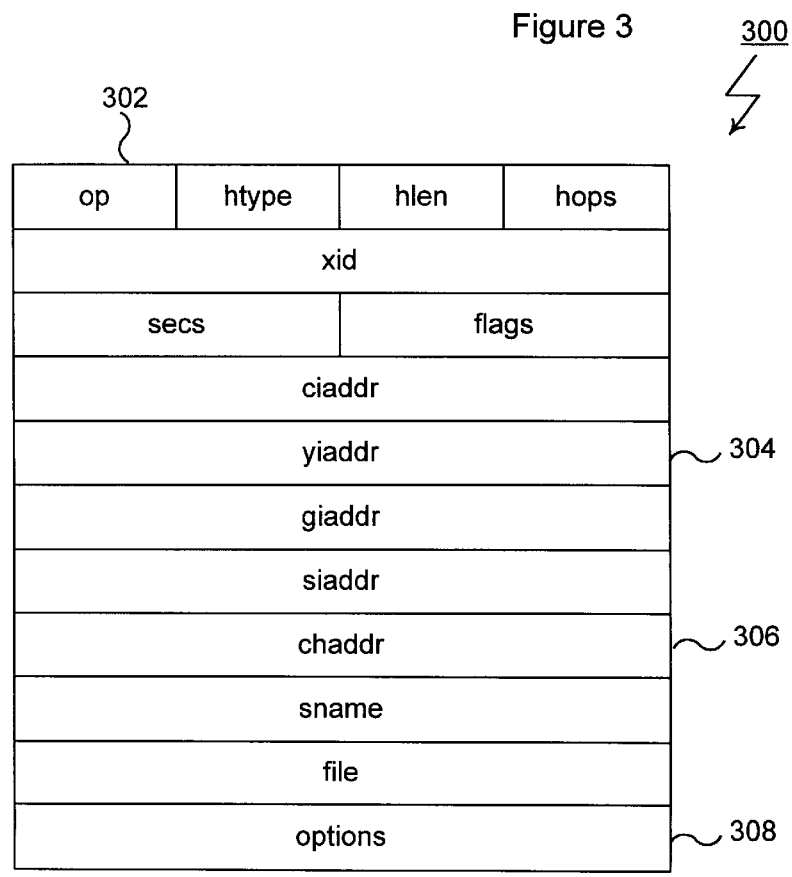
FIG. 3 is a block diagram of a DHCP message used in a preferred embodiment of the present invention.

A preferred format for DCHP messages sent between client systems 102 and DHCP server system 110 is shown in FIG. 3 and generally designated 300. Structurally, a DCHP message includes an op field 302, a yiaddr field 304, a chadddr field 306 and an options field 308 (Examination of FIG. 3 shows that each message also includes a number of other fields. For the sake of brevity, these fields will not be discussed with particularity). Functionally, each DHCP message has a type, such as DHCPDISCOVER, DHCPOFFER, DHCPREQUEST or DHCPACK. The type of each DHCP message is encoded into the options field 308. The options field 308 is also used for a number of other purposes, including the encoding of vendor-specific information. Each DHCP message is marked to indicate whether it is being sent from a client system 102 or a DHCP server system 110. This marking is performed by setting op 302 to BOOTREQUEST, or BOOTREPLY, respectively. Within a message, the yiaddr field 304 includes, for certain types of DHCP messages, an IP address being passed from a DHCP server 110 to a client system 102. The chadddr field 306 is used for the machine address of a client system 102 (also known as a "MAC" address).

Figure 4:
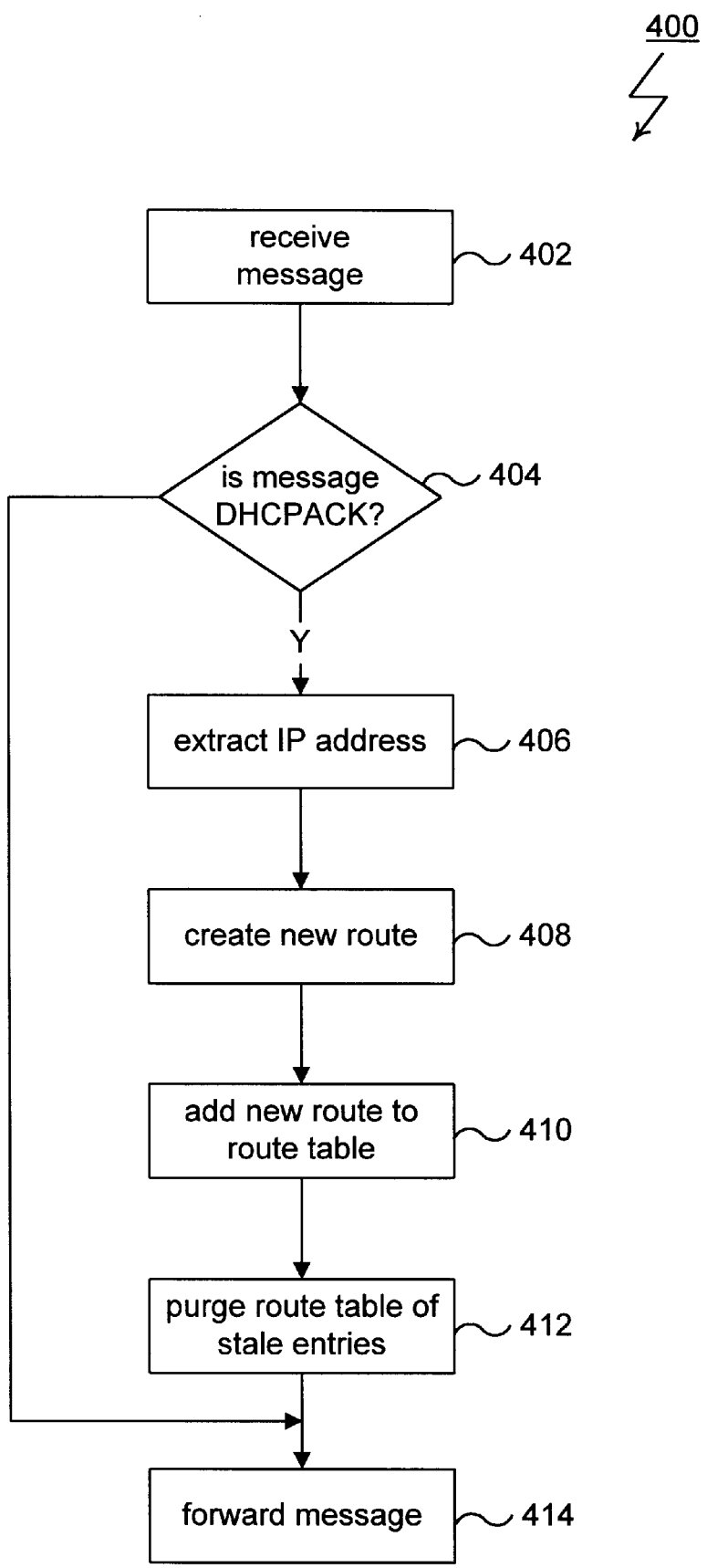
FIG. 4 is a flowchart showing the steps associated with a preferred embodiment of the IP address learning method of the present invention.

An embodiment of the present in vention includes a method for learning IP addresses assigned by DHCP server 110. More specifically, a method used by router 106 to learn IP addresses assigned by DHCP server 110 is shown in FIG. 4 and generally designated 400. Method 400 begins with step 400 where the router 106 receives a DHCP message of the type shown in FIG. 3. In step 404, the router process 214 examines the received message to determine if a DCHPACK has been received. Generally, this is performed by examination of options field 308 of the received message.

If the received message is a DHCPACK, execution of method 400 continues at step 406. In step 406, the router process 214 extracts the IP address included in the yiaddr field 304 of the DHCPACK message. According to the DHCP protocol, the extracted IP address has been allocated by the DHCP server 110 for use by a client system 102.

In step 410, the router process 214 uses the IP address extracted in step 406 to create a route for the client system 102. The route is a mapping that tells the router 106 that IP packets directed at the IP address allocated by the DHCP server 110 are to be forwarded to the client system 102. In step 410, the router process 214 updates the route table 216 to include the new route. Importantly, the route process 214 marks the new route to indicate that it is DHCP assigned. Thereafter, the route process 214 will only override this route if the router 106 receives another DHCPACK reassigning the same IP address extracted in step 406.

In step 412, which follows, the router process 214 purges the route table 216 of invalid or stale entries. For the purposes of the present invention, "stale" entries are previously learned routes included in the route table 216 that are invalidated by the new route added by the router process 214 in step 410. Thus, previously learned routes that associate the client system 102 with IP addresses that differ from the IP address allocated by the DHCP server 110 are removed from the route table 216. Additionally, previously learned routes that associate the IP address allocated by the DHCP server 110 with client systems 102 other than the client system requesting the IP address are also removed from the route table 216. In this way, the IP address allocated by the DHCP server 110 for the client system 102 overrides previously learned routes. Importantly, routes that are statically configured in the router 106 are not removed. Thus, the present invention may be used where a network includes one or more statically assigned IP addresses.

In step 414, the router 106 forwards the DHCPACK message to the modem 104 for receipt by client system 102. Step 414 is also executed if the router process 214 determines in step 404 that the received message is not a DHCPACK message.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for routing packets in a computer network that includes one or more client systems connected to a router, the router including one or more routes, each route mapping an IP address to a client system, the method comprising the steps, performed by the router, of:

detecting the allocation of a specified IP address to a specified client system;

creating a new route within the router, the new route mapping the specified IP address to the specified client system;

marking the new route so that it can only be overwritten by a subsequent DHCP address assignment;

deleting routes stored within the router that are invalidated by the new route; and routing IP packets in accordance with the routes stored within the router.

2. A method as recited in claim 1 wherein the network includes a DHCP server and the step of detecting the allocation of a specified IP address to a specified client system further comprising the step, performed by the router, of detecting a DHCPACK sent by the DHCP server, the DHCPACK including the specified IP address allocated to the specified client system.

3. A method as recited in claim 1 wherein the step of deleting routes stored within the router that are invalidated by the new route further comprises the step, performed by the router, of deleting routes that associate the specified client system with IP addresses that are not the specified IP address.

4. A method as recited in claim 1 wherein the step of deleting routes stored within the router that are invalidated by the new route further comprises the step, performed by the router, of deleting routes that associate the specified IP address with clients systems that are not the specified client system.

5. A method as recited in claim 1 wherein one or more of the routes stored within the router are established during configuration of the router.

6. A method as recited in claim 5 wherein the routes established during configuration of the router are not changed by the steps of creating a new route within the router and deleting routes stored within the router.

7. A computer program product comprising:

a computer usable medium having computer readable code embodied therein for routing packets in a computer network that includes one or more client systems connected to a router, the router including one or more routes, each route mapping an IP address to a client system, the computer program product including:

first computer readable program code devices configured to cause a computer system to detect the allocation of a specified IP address to a specified client system;

second computer readable program code devices configured to cause the computer system to create a new route within the router, marking the new route so that it can only be overwritten by a subsequent DHCP address assignment the new route mapping the specified IP address to the specified client system;

third computer readable program code devices configured to cause the computer system to delete routes stored within the router that are invalidated by the new route; and fourth computer readable program code devices configured to cause the computer system to route IP packets in accordance with the routes stored within the router.

8. A computer program product as recited in claim 7 wherein the first computer readable program code devices further comprises fifth computer readable program code devices configured to cause the computer system to detect a DHCPACK message sent by a DHCP server to the specified client system, the DHCPACK message including the specified IP address allocated to the specified client system.

9. A computer program product as recited in claim 8 wherein the third computer readable program code devices are configured to cause the computer system to delete routes stored within the router that associate the specified client system with IP addresses that are not the specified IP address.

10. A computer program product as recited in claim 8 wherein the third computer readable program code devices are configured to cause the computer system to delete routes stored within the router that associate the specified IP address with clients systems that are not the specified client system.

11. A computer program product as recited in claim 8 wherein one or more of the routes stored within the router are established during configuration of the router.

12. A computer program product as recited in claim 11 wherein the routes established during configuration of the router are not changed by the second computer readable program code devices and third computer readable program code devices.

13. An apparatus for routing packets in a computer network that includes one or more client systems connected to a router, the router including one or more routes, each route mapping an IP address to a client system, the apparatus comprising:

a first portion configured to cause a computer system to detect the allocation of a specified IP address to a specified client system;

a second portion configured to cause the computer system to create a new route within the router, marking the new route so that it can only be overwritten by a subsequent DHCP address assignment the new route mapping the specified IP address to the specified client system;

a third portion configured to cause the computer system to delete routes stored within the router that are invalidated by the new route; and a fourth portion configured to cause the computer system to route IP packets in accordance with the routes stored within the router.

14. An apparatus as recited in claim 13 wherein the first portion further comprises a fifth portion configured to cause the computer system to detect a DHCPACK message sent by a DHCP server to the specified client system, the DHCPACK message including the specified IP address allocated to the specified client system.

15. An apparatus as recited as recited in claim 14 wherein the third portion is configured to cause the computer system to delete routes stored within the router that associate the specified client system with IP addresses that are not the specified IP address.

16. An apparatus as recited in claim 14 wherein the third portion is configured to cause the computer system to delete routes stored within the router that associate the specified IP address with clients systems that are not the specified client system.

17. An apparatus as recited as recited in claim 13 wherein one or more of the routes stored within the router are established during configuration of the router.

18. An apparatus as recited as recited in claim 17 wherein the routes established during configuration of the router are not changed by the second portion and third portion.

* * * * *

UNITED STATES PATENT AND TRADEMARK OFFICE
CERTIFICATE OF CORRECTION

PATENT NO. : 5,922,049
DATED : July 13, 1999
INVENTOR(S) : Sanjay R. Radia, et al.

It is certified that error appears in the above-identified patent and that said Letters Patent is hereby corrected as shown below:

On the title page, item[73] Assignee, should read—

Sun Microsystems, Inc., Palo Alto, Calif.;
Motorola, Inc., Schaumburg, Ill. --.

Signed and Sealed this

Eleventh Day of July, 2000

*Attest:*

Q. TODD DICKINSON

*Attesting Officer*     *Director of Patents and Trademarks*